3,100,718
COPPER BORATE ANTIFOULING PIGMENT

Edward J. Dunn, Jr., Port Washington, and Martin Kushner, Long Island City, N.Y., assignors to National Lead Company, New York, N.Y., a corporation of New Jersey
No Drawing. Filed June 30, 1961, Ser. No. 120,934
4 Claims. (Cl. 106—308)

This invention relates to a novel antifouling and mildew resistant copper pigment.

Copper compounds have long been known as among the best antifouling pigments to protect structures in underwater environments from fouling with algae, barnacles and other marine growths, and, particularly in the case of wooden structures, against the ravages of teredos or shipworms, limnoria, martesia, sphaeroma, and the like. In addition, their effectiveness as mildew resistant pigments against such fungi as *Aspergillus niger, Aspergillus flavus, Penicillium luteum* and the like, are well known to the art. These pigments, however, and paints based upon them are quite expensive, and the protection of wooden structures such as houses, boats, pilings and the like, by the use thereof is a costly proposition.

Although such pigments, to be fully effective, must be applied in relatively large amounts, as compared for example with decorative finishes, the entire amount of pigment is not effectively utilized because only the surface of the particle is capable of exerting antifouling activity.

An object of this invention therefore is to provide an improved antifouling pigment.

A further object of this invention is to provide a composite pigment characterized by having resistance to mildew.

Another object of this invention is to provide an antifouling pigment wherein the toxic pigment component is more efficiently utilized, thereby reducing the amount of pigment needed for protection in a given application.

Other objects and advantages will become apparent from the following more complete description and claims.

Broadly, this invention contemplates a composite pigment particle comprising a silica core and a coating of copper borate.

This invention also contemplates a paint composition comprising a silica cored-copper borate particle. In addition, there is also contemplated a process for the manufacture of a silica-cored-copper borate particle.

The pigments of this invention may be made by forming an intimate mixture of silica with a copper salt of an acid which has a water-soluble alkali salt. Among the most convenient of such compounds and also among the least expensive is copper sulphate pentahydrate, $CuSO_4 \cdot 5H_2O$. Other copper compounds such as the chloride, nitrate, etc. may be used equally well. The silica may be introduced in finely divided form, or may be ground simultaneously with the mixing operation, by starting with unground silica and introducing the silica together with the copper compound into a ball mill and grinding them together in aqueous slurry. The latter procedure is preferred since the freshly-fractured surfaces of the silica appear to pick-up and retain the copper compound more adherently than the old surfaces of silica which was previously finely divided. The silica-copper mixture is then transferred to a reaction tank and treated with caustic in amount sufficient to react with the copper salt, and preferably in slight excess. Approximately enough caustic is added to give an alkaline pH preferably of 8 or higher. This is sufficient to condition the surface of the silica, thereby further assisting in the pick-up and retention of copper compounds. Additional caustic may be used if desired but there is no particular advantage in so doing. The caustic may be sodium or potassium hydroxide. Other caustic alkalis might be used if desired but would be considered too expensive for most purposes. The addition of the caustic causes the mass to thicken and it is usually necessary to add more water as needed to preserve a workable consistency. After the mixture containing the caustic has been thoroughly blended, preferably by agitating for a period of time, for example an hour, after addition of the caustic, the slurry is filtered and washed to remove as much of the alkali sulfate (or alkali salt corresponding to the copper compound originally employed) as practicable. The resulting filter cake is composed of copper hydroxide coated on a silica core. To form a copper borate coated silica, this washed filter cake is again mixed with a small quantity of water sufficient to form a heavy consistency paste and to this paste is added a heavy slurry of boric acid or boric acid crystals. The amount of water present in the final heavy slurry should be in amount sufficient to wet the copper hydroxide coated silica but not so much as to cause the gel or the boric acid to settle out. The amount of water will also vary depending upon, for example, the particle size of the silica, the temperature of the slurry and the percent coating desired in the final product which is determined by the amount of boric acid addition. When minimum amounts of water are present forming a heavy consistency paste, and an intimate mixing of boric acid and the copper hydroxide coated silica is performed, such as by ball milling, the boric acid physically enters into the gel like copper hydroxide coating and reacts therewith resulting in a copper borate coated silica cored particle. After the heavy consistency paste has been thoroughly blended with the boric acid, it is then transferred to trays or the like and dried, preferably without deliquoring. The drying of the copper borate coated silica should preferably be carried out at a relatively low temperature, e.g. 100° C. to 125° C., so as to allow a slow evaporation of water. It is during evaporation that the reaction between the copper hydroxide and boric acid is completed. Temperatures above 130° C. including high temperatures usually employed for calcination should not be used during the drying inasmuch as the boric acid will sublime thereby leading to the decomposition of the product. The trays should be stirred occasionally to avoid segregation of the products or undue agglomeration of the particles. As the cake dries it turns light blue, indicative of the formation of copper borate, and in the present invention, copper borate coated on silica. When fully dried, the product should preferably be ground in a hammer mill or equivalent apparatus so as to disintegrate any agglomerates formed.

The ratio of copper compound to silica in the pigments of this invention may vary widely. In order to improve to any appreciable degree the efficiency of utilization of the antifouling or mildew resistant pigment, however, it is necessary that at least about 25% by weight of the composition be silica. On the other hand when the composition is too high in silica and correspondingly deficient in copper compound, for example when the silica is present in amount higher than about 75% by weight, the large bulk of silica present tends to dilute the active ingredient, i.e. the copper compound, to such an extent that it actually interferes with its effectiveness. In general it is preferred to use compositions containing about 30 to 60% silica.

In order to further illustrate the nature of this invention and the manner of carrying out the same, the following examples are presented:

EXAMPLE I

Silica, 1492 grams, copper sulphate, $CuSO_4 \cdot 5H_2O$, 2500 grams and 1500 ml. of water were placed in a ball mill and ground over night. The ground slurry was transferred to a reaction tank and heated to 60° C. 800 grams of technical grade sodium hydroxide was dissolved in 2000 ml. of water and added dropwise, fairly rapidly, to the reaction tank while stirring vigorously. As the mass thickened, additional water was added to maintain a workable consistency. The batch was stirred for an additional hour after all the caustic had been added. The pH approximated 9.2.

After the additional hour stirring, the slurry was filtered and washed with hot water to remove as much of the sodium sulphate as practicable. The washed filter cake was then mixed with a small amount of water to form a very heavy slurry. While stirring, a heavy water slurry containing 1240 grams of technical grade boric acid, fine granular, was stirred into the mixture. The slurry was then transferred (without deliquoring) to drying trays and placed in an oven maintained at approximately 120° C. The trays were stirred occasionally to avoid segregation of the products. As the cake dried it turned to a light pastel blue. When fully dried, the product was ground in a Raymond mill using a 0.02 inch circular screen. The resulting pigment was a copper borate coated silica, containing approximately 50% active material.

The copper borate coated silica was incorporated into a paint formulation to determine its effectiveness against mildew growth. Table I denotes the paint formulations that were applied two coats self-primed to 8″ x 11″ cedar panels for exposure on the sun side and on the shade side of a 45° fence. The figures represent percent by weight.

where paint 4 was compared to paint 7. In addition when equal amounts of active material were present in the paints, for example paints 4 and 6, the instant invention was superior in mildew resistance.

In white paints, this pigment was found to possess excellent properties for maintaining painted surfaces white and clean after outdoor exposure. In addition, the copper borate coated silica pigment may be used as an antifouling pigment in view of its slight solubility in salt water and this solubility will help wash off any algae, barnacles, etc., that may have formed.

The copper borate coated silica was incorporated into a paint formulation to determine its effectiveness as an antifouling agent. Table II denotes the paint formulation that was applied. One coat of standard wash primer was applied at 0.4 mil thickness, followed by two coats of test paint on 6″ x 12″ x 1″ cedar panels. The figures represent percent by weight.

*Table II*

ANTIFOULING PAINT FORMULATION

|  | Paint 8 |
|---|---|
| Percent pigment | 52.8 |
| Copper borate coated silica | 98.7 |
| Bentone 34 (organophilic bentonite) | 1.3 |
| Percent vehicle | 47.2 |
| Water white rosin | 38.8 |
| Chlorinated biphenyl | 11.5 |
| Pine oil | 2.9 |
| Solvents | 46.8 |

Bentone 34 is an organophilic bentonite prepared by

*Table I*

MILDEW RESISTANCE PAINT FORMULATIONS

|  | Paint 1 | Paint 2 | Paint 3 | Paint 4 | Paint 5 | Paint 6 | Paint 7 |
|---|---|---|---|---|---|---|---|
| Percent Pigment | 60.0 | 59.8 | 59.8 | 59.6 | 59.8 | 59.8 | 59.7 |
| Pigment Composition: |  |  |  |  |  |  |  |
| Composite Lead sulphate lead silicate pigment | 24.2 | 24.3 | 24.4 | 24.6 | 24.3 | 24.4 | 24.5 |
| Zinc Oxide | 18.2 | 18.3 | 18.3 | 18.5 | 18.3 | 18.3 | 18.3 |
| Rutile TiO$_2$ | 18.2 | 18.3 | 18.3 | 18.5 | 18.3 | 18.3 | 18.3 |
| Magnesium Silicate | 39.4 | 36.1 | 32.8 | 26.1 | 36.1 | 33.0 | 26.7 |
| Copper borate coated silica |  | 3.0 | 6.2 | 12.3 |  |  |  |
| Copper borate |  |  |  |  | 3.0 | 6.0 | 12.2 |
| Percent Vehicle | 40.0 | 40.2 | 40.2 | 40.4 | 40.2 | 40.2 | 40.3 |
| Vehicle Composition: |  |  |  |  |  |  |  |
| Low acid grinding linseed oil | 65.9 | 65.9 | 65.9 | 65.9 | 65.9 | 65.9 | 65.9 |
| PHBZ$_2$ linseed #555 | 16.0 | 16.0 | 16.0 | 16.0 | 16.0 | 16.0 | 16.0 |
| Volatile Petroleum Solvent | 14.3 | 14.3 | 14.3 | 14.3 | 14.3 | 14.3 | 14.3 |
| Drier | 3.8 | 3.8 | 3.8 | 3.8 | 3.8 | 3.8 | 3.8 |

PHBZ$_2$ linseed #555 is a pale heat bodied linseed oil with a Z$_2$ viscosity.

The results showed that after 8 months of exposure, no mildew growth was observed on any of the panels. These exposure tests were conducted from September to May at an exposure site located at Sayville, New York. After 11 months exposure ending in August, the mildew growth on paint 1, both on the sun side and shade side was very severe. Paints 2, 3 and 4 containing the instant invention were all superior to paint 1 on the sun side and on the shade side and showed excellent anti-mildew properties.

Paints 2, 3, and 4 representing the present invention, were compared to paints 5, 6, and 7 containing pure copper borate, in the shade for the same period of time. The results showed that equal amounts of additive gave identical anti-mildew results; i.e. paints 2 and 5 gave equal results, paints 3 and 6 gave equal results, etc. It should be noted, that although, for example, paints 3 and 6 both had approximately the same amount of anti-mildew additive present and yielded identical results, paint 3 containing the instant invention, only had approximately ½ of the active copper borate present in paint 6. This clearly demonstrates that the applicants' invention results in greater efficiency of the active material. Identical results were found when paint 2 was compared to paint 5 and the reaction of bentonite with an aliphatic ammonium salt.

The results showed that after six months exposure in Florida waters, the panel was free of fouling.

The copper borate coated silica pigment contemplated by this invention may be included in the paint formulation wherein it comprises 100% of the pigment or, in combination with other pigments such as corrosion inhibitive pigments, coloring pigments, filler pigments or other anti-fouling and mildew resistant pigments, where the copper borate coated silica pigment may comprise as little as 1% of the total pigment. As is obvious to those skilled in the art, the amount of antifouling or mildew resistant pigment present in the paint formulation may vary over wide limits depending upon, for example, the vehicle composition and the resins and plasticizers used therein, and may therefore be left to the discretion of the paint formulator.

While this invention has been described with reference to certain specific embodiments and illustrated by way of specific examples, these are illustrative only and the invention is not to be construed as limited except as set forth in the following claims.

We claim:

1. A composite pigment particle consisting essentially of a silica core and a coating of copper borate, said silica analytically present within the range of from 25% to 75%.

2. A composite pigment particle consisting essentially of a silica core and a coating of copper borate, said silica analytically present within the range of from 30% to 60%.

3. A paint composition comprising as pigment therefor, a silica cored-copper borate particle.

4. A process for the manufacture of a silica cored-copper borate particle which comprises the steps (1) mixing in an aqueous medium, silica, a copper salt of an acid which has a water soluble alkali salt, (2) treating this mixture with an alkali metal hydroxide in amounts sufficient to give the mixture a pH of at least 8, said mixture maintained at a temperature not exceeding 60° C., (3) filtering and removing the alkali salt, (4) adding water in amount to form a heavy paste and adding thereto with mixing boric acid (5) and drying said paste at a temperature not exceeding 130° C.

References Cited in the file of this patent
UNITED STATES PATENTS

| | | |
|---|---|---|
| 2,767,202 | Rottig et al. | Oct. 16, 1956 |
| 2,847,475 | Voge et al. | Aug. 12, 1958 |
| 3,004,857 | Merson et al. | Oct. 17, 1961 |

OTHER REFERENCES

Williams et al.: "A New Pigment Concept," Ind. & Eng. Chem., October 1948, vol. 40, No. 10 (pages 1948–50).

Condensed Chemical Dictionary, 4th ed., (1950), published by Reinhold, New York City (page 190).